United States Patent
Birinov et al.

(10) Patent No.: US 7,747,096 B2
(45) Date of Patent: Jun. 29, 2010

(54) METHOD, MEDIUM, AND SYSTEM ENCODING/DECODING IMAGE DATA

(75) Inventors: Dmitri Birinov, Yongin-si (KR); Hyun Mun Kim, Seongnam-si (KR); Daesung Cho, Seoul (KR); Wooshik Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1019 days.

(21) Appl. No.: 11/486,148

(22) Filed: Jul. 14, 2006

(65) Prior Publication Data

US 2007/0025626 A1 Feb. 1, 2007

(30) Foreign Application Priority Data

Jul. 15, 2005 (KR) .................. 10-2005-0064289

(51) Int. Cl.
 G06K 9/46 (2006.01)
(52) U.S. Cl. .................. 382/240; 382/232; 382/233; 382/239; 382/241
(58) Field of Classification Search .................. 382/232, 382/233, 240, 241, 239, 238; 375/E7.048, 375/E7.051, 240.19
See application file for complete search history.

(56) References Cited

U.S. PATENT DOCUMENTS

| | | | |
|---|---|---|---|
| 7,016,546 B2* | 3/2006 | Fukuhara et al. | 382/239 |
| 7,333,544 B2* | 2/2008 | Kim et al. | 375/240.16 |
| 7,359,561 B2* | 4/2008 | Fukuhara et al. | 382/240 |
| 7,454,075 B2* | 11/2008 | Fukuhara et al. | 382/240 |
| 7,535,961 B2* | 5/2009 | Cho et al. | 375/240.12 |

OTHER PUBLICATIONS

Sullivan, G. et al., "Draft of Version 4 of H.264/AVC (ITU-T Recommendation H.264 and ISO/IEC 14496-10 (MPEG-4 part 10) Advanced Video Coding)," ISO/IEC JTC1/SC29/WG11, Document: JVT-N050d1, Hong Kong, Jan. 2005.

* cited by examiner

Primary Examiner—Anh Hong Do
(74) Attorney, Agent, or Firm—Staas & Halsey LLP

(57) ABSTRACT

A method, medium, and system encoding and/or decoding image data by dividing image data into block units, and generating a bitstream by entropy encoding the image data in order of the divided blocks. The decoding method may include receiving an input of a bitstream, and restoring image data by entropy decoding the block units of the bitstream. According to the method, medium, and system, when image data is encoded and/or decoded by using a residue color transform, a bitstream can be generated and encoded in block units of the image, and when the bitstream is decoded, an image can be restored from the bitstream. By doing so, the conventional delay of image processing can be prevented.

32 Claims, 8 Drawing Sheets

METHOD, MEDIUM, AND SYSTEM ENCODING/DECODING IMAGE DATA

CROSS-REFERENCE TO RELATED APPLICATIONS

This application claims the priority benefit of Korean Patent Application No. 10-2005-0064289, filed on Jul. 15, 2005, in the Korean Intellectual Property Office, the disclosure of which is incorporated herein in its entirety by reference.

BACKGROUND OF THE INVENTION

1. Field of the Invention

Embodiments of the present invention relate at least to a method, medium, and system encoding and/or decoding image data, and more particularly, to a method, medium, and system encoding and/or decoding image data using a residue color transform to remove redundancy between chroma components in the image data.

2. Description of the Related Art

Generally, when an image is encoded, in order to increase the compression ratio, a color image format, such as an RGB format, is converted into an image format more appropriate for compression, such as a YCrCb format. However, when conversion to the YCrCb format is performed, the quality of an image is degraded during encoding such that the quality of any restored image through decoding of the encoded image will always be lowered. If, in order to reduce this loss from occurring when the RGB format is converted into the YCrCb format, each of the RGB color components is encoded independently in the conventional YCrCb encoder the correlation remaining between the RGB components cannot be used and the encoding efficiency is still lowered.

Recently, a residue transform technology ("Draft of Version 4 of H.264/AVC (ITU-T Recommendation H.264 and ISO/IEC 14496-10 (MPEG-4 part 10) Advanced Video Coding)", ISO/IEC JTC 1/SC 29/WG 11, Document: JVT-N050d1, Hong Kong, January, 2005) has been proposed as a way of increasing encoding efficiency by reducing redundancy between color components through the use of correlations between color components.

Generally, image data is processed in macroblocks of 16×16 pixels, for example, when encoding and/or decoding is performed, as illustrated in FIG. 1 with three color components of the one macroblock. Although the term macroblock is used herein as a block within an image, the macroblock is not limited thereto. Here, one macroblock may further be divided into 4 block units of 8×8 pixels and processed. Accordingly, FIG. 1 illustrating an ordinary encoding order of the block units within each image macroblock. As illustrated, encoding is performed in block units of the color components macroblocks, of a macroblock, i.e., encoding is performed on the block units within the Y color component of the macroblock, then the Cb color component of the macroblock, and then the Cr color component of the macroblock. Herein, we will refer to these different color components as color component macroblocks.

Encoding of the Y color component macroblock is performed in an order of a first Y block unit 100, a second Y block unit 105, a third Y block unit 110, and a fourth Y block unit 115. Here, each block unit within the color macroblock may have identical sizes of 8×8 pixels, for example. Thereafter, encoding of the Cb color component macroblock is performed in the order of a first Cb block unit 120, a second Cb block unit 125, a third Cb block unit 130, and a fourth Cb block unit 135, and then, encoding of the Cr component macroblock is performed in the order of a first Cr block unit 140, a second Cr block unit 145, a third Cr block unit 150, and a fourth Cr block unit 155. Thus, the conventional encoding process sequences through the separate color components of a macroblock, e.g., from the Y color component macroblock, to the Cb color component macroblock, to the Cr color macroblock, and within each color component, the separate block units are encoded with a particular order.

FIG. 2 illustrates an ordinary structure of a corresponding bitstream, generated through entropy encoding of the encoded image data. As illustrated, the coefficients for block units, quantized in the particular order of Y, Cb and then Cr color components, are contiguously set forth in the bitstream in the same numbered order as the block encoding illustrated in FIG. 1, i.e., the bitstream first includes all block Y component information, sequentially from a block 1 through block 4 (illustrated FIG. 1 numbered block units 0, 1, 2, and 3) of the Y color component macroblock, then the block Cb component information, again sequentially from block 1 through block 4 (illustrated FIG. 1 numbered block units 4, 5, 6, and 7), and finally the block Cr component information, sequentially from block 1 through block 4 (illustrated FIG. 1 numbered block units 8, 9, 10, and 11). Here, when referring to "block" 1, 2, 3, or 4, of any of the color components, this reference is meant to refer to the corresponding position within each color component macroblock, e.g., block 1 of each color component macroblock is the left upper block unit, while the block 4 of each color component macroblock is the lower right block unit.

With the ordering of the conventional bitstream explained, FIG. 3 similarly illustrates the ordinary decoding order of image macroblocks. Accordingly, the decoding is performed in the same block units for each color component as the encoding. In particular, with the bitstream similar to that of FIG. 2 being input to a decoding system, entropy decoding, inverse quantization, and an inverse frequency domain transform, such as an inverse discrete cosine transform (IDCT), can be sequentially performed through color components, by reading data from the bitstream in the respective ordered block units.

More specifically, data in relation to the first Y block unit 100 is entropy decoded from the bitstream, and then, inverse quantization and an inverse frequency domain transform, such as an IDCT, are performed on the first Y block unit 100. If the entropy decoding for the first Y block unit 100 is completed, the entropy decoding, inverse quantization and inverse frequency domain transform for the second Y block unit 105 are performed. In the same manner, the entropy decoding, inverse quantization and inverse frequency domain transform for the third and fourth Y block units are then sequentially performed. By doing so, decoding of the Y color component is processed.

After the decoding of the Y color component macroblock is complete, decoding of the Cb color component may then be performed in the same manner, and then, similarly, decoding for the Cr color component may thereafter be performed. In this manner, decoding is performed sequentially in relation to each color component macroblock.

Accordingly, in such a conventional arrangement, if a residue color transform is performed during the encoding operation, then, during the decoding, an inverse residue color transform should be performed after the entropy decoding, inverse quantization and inverse frequency domain transform have completed.

Since the inverse residue transform is performed in block units of 8×8 blocks, for example, the inverse residue transform can be performed only after all pixel values of 8×8 block units of all Y, Cb, Cr color components have been restored. Accordingly, when decoding is performed in the conventional decoding order, the inverse residue color transform is delayed as shown in FIG. 3, thereby delaying the entire decoding process.

Thus, the inventors of the present invention have found that this delay is undesirable, and embodiments of the present invention attempt to avoid the same.

SUMMARY OF THE INVENTION

With this in mind, embodiments of the present invention set forth an image data encoding and/or decoding method, medium, and system enabling prevention of this delay in a decoding process when residue transform is implemented during the encoding and/or decoding process.

Additional aspects and/or advantages of the invention will be set forth in part in the description which follows and, in part, will be apparent from the description, or may be learned by practice of the invention.

To achieve the above and/or other aspects and advantages, embodiments of the present invention include an image encoding method of encoding image data, the method including dividing image data into block units for separate component macroblocks, of an image macroblock, and generating a bitstream by sequentially entropy encoding select block units, each from different component macroblocks, such that encoded block units from a same component macroblock are staggered within the bitstream.

The macroblock may represent a reduced pixel portion of the image data and each component macroblock may be made up of four block units, and the separate component macroblocks include at least a component macroblock for luminance information, of the image macroblock, and a component macroblock for chrominance information, of the image macroblock.

The method may further include performing residue color transform of the image data.

In addition, in the residue color transform, RGB data may be transformed into YCoCg data based on:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

In addition, in the residue color transform, RGB data may be transformed into YCoCg data based on:

$Co = R - B$ $t = B + (Co >> 1)$ $Cg = G - t$ $Y = t + (Cg >> 1)$

The method may further include performing temporal prediction encoding of the image data, and performing residue color transform of resultant temporal prediction encoded data.

Still further, the method may include performing spatial prediction encoding of the image data, and performing residue color transform of resultant spatial prediction encoded data.

To achieve the above and/or other aspects and advantages, embodiments of the present invention include an image decoding method of decoding image data, the method including reading a bitstream, and restoring image data of a macroblock of an original image by sequentially entropy decoding block units from the bitstream, with sequential block unit information in the bitstream being for a same area within the macroblock while being from different component macroblocks of the macroblock.

The method may further include receiving the bitstream.

The macroblock may represent a reduced pixel portion of the original image and each different component information may correspond to a separate component macroblock that is made up of four block units, with the separate component macroblocks including at least a component macroblock for luminance information of the macroblock and a component macroblock for chrominance information of the macroblock.

The method may still further include inverse residue color transforming the entropy decoded block units corresponding to the macroblock.

In the inverse residue color transform, YCoCg data may be transformed into RGB data based on:

$$\begin{bmatrix} R \\ G \\ B \end{bmatrix} = \begin{bmatrix} 1 & 1 & -1 \\ 1 & 0 & 1 \\ 1 & -1 & 1 \end{bmatrix} \begin{bmatrix} Y \\ Co \\ Cg \end{bmatrix}$$

In the inverse residue color transform, YCoCg data may be transformed into RGB data based on:

$t = Y - (Cg >> 1)$ $G = Cg + t$ $B = t - (Co >> 1)$ $R = B + Co$

The restoring of the image data may include performing inverse frequency domain transform of data for the entropy decoded block units, and performing the inverse residue color transform of resultant inverse frequency domain transformed block data.

The method may further include inverse quantizing the entropy decoded block units.

In addition, the inverse residue color transform may be performed immediately after the inverse frequency domain transform of the data of the entropy decoded blocks is completed.

To achieve the above and/or other aspects and advantages, embodiments of the present invention include at least one medium including computer readable code to implement embodiments of the present invention.

To achieve the above and/or other aspects and advantages, embodiments of the present invention include a signal including sequentially entropy encoded select block units, each from different component macroblocks of a macroblock, such that encoded block units from a same component macroblock are staggered within the signal, for reproducing image data through interaction with a computational device by receiving information of the signal and reproducing the image data by sequentially entropy decoding block units from the signal, and performing an inverse residue transform of data of the decoded block units.

To achieve the above and/or other aspects and advantages, embodiments of the present invention include an image encoding system for encoding image data, the system including a block data generation unit to divide image data into block units for separate component macroblocks, of an image macroblock, and an entropy encoding unit to generate a bitstream by sequentially entropy encoding select block units, each from different component macroblocks, such that encoded block units from a same component macroblock are staggered within the bitstream.

The system may further include a residue transform unit to perform residue color transform of the image data.

Here, the residue transform unit may transform RGB data into YCoCg data based on:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

In addition, the residue transform unit may transform RGB data into YCoCg data based on:

$Co=R-B$ $t=B+(Co>>1)$ $Cg=G-t$ $Y=t+(Cg>>1)$

The system may include a temporal prediction unit to perform temporal prediction encoding of the image data, and a residue transform unit to perform residue color transform of resultant temporal prediction encoded data.

The system may further include a spatial prediction unit performing spatial prediction encoding of the image data, and a residue transform unit performing residue color transform of resultant spatial prediction encoded data.

To achieve the above and/or other aspects and advantages, embodiments of the present invention include an image decoding system for decoding image data, the system including a bitstream reading unit to read a bitstream, and an entropy decoding unit to restore image data of a macroblock of an original image by sequentially entropy decoding block units from the bitstream, with sequential block unit information in the bitstream being for a same area within the macroblock while being from different component macroblocks of the macroblock.

The system may include a bitstream input unit to receive an input of the bitstream.

In addition, the system may include an inverse residue transform unit to perform an inverse residue color transforming of the entropy decoded block units corresponding to the macroblock.

Here, the inverse residue transform unit may transform YCoCg data into RGB data based on:

$$\begin{bmatrix} R \\ G \\ B \end{bmatrix} = \begin{bmatrix} 1 & 1 & -1 \\ 1 & 0 & 1 \\ 1 & -1 & 1 \end{bmatrix} \begin{bmatrix} Y \\ Co \\ Cg \end{bmatrix}$$

Further, the inverse residue transform unit may transform YCoCg data into RGB data based on:

$t=Y-(Cg>>1)$ $G=Cg+t$ $B=t-(Co>>1)$ $R=B+Co$

The system may include an inverse frequency domain transform unit to perform inverse frequency domain transform of data for the entropy decoded block units, and a residue transform unit to performing residue color transform of resultant inverse frequency domain transformed block data.

The system may further include an inverse quantization unit to inverse quantize entropy decoded block units.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
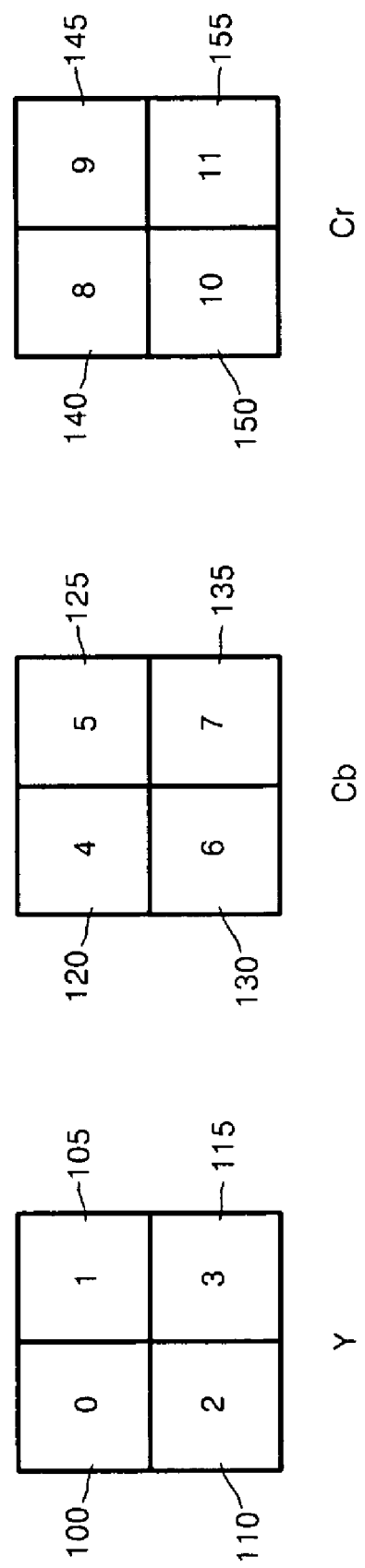
FIG. 1 illustrates a conventional encoding order of image block units in color component macroblocks for a single macroblock.
Figure 2:
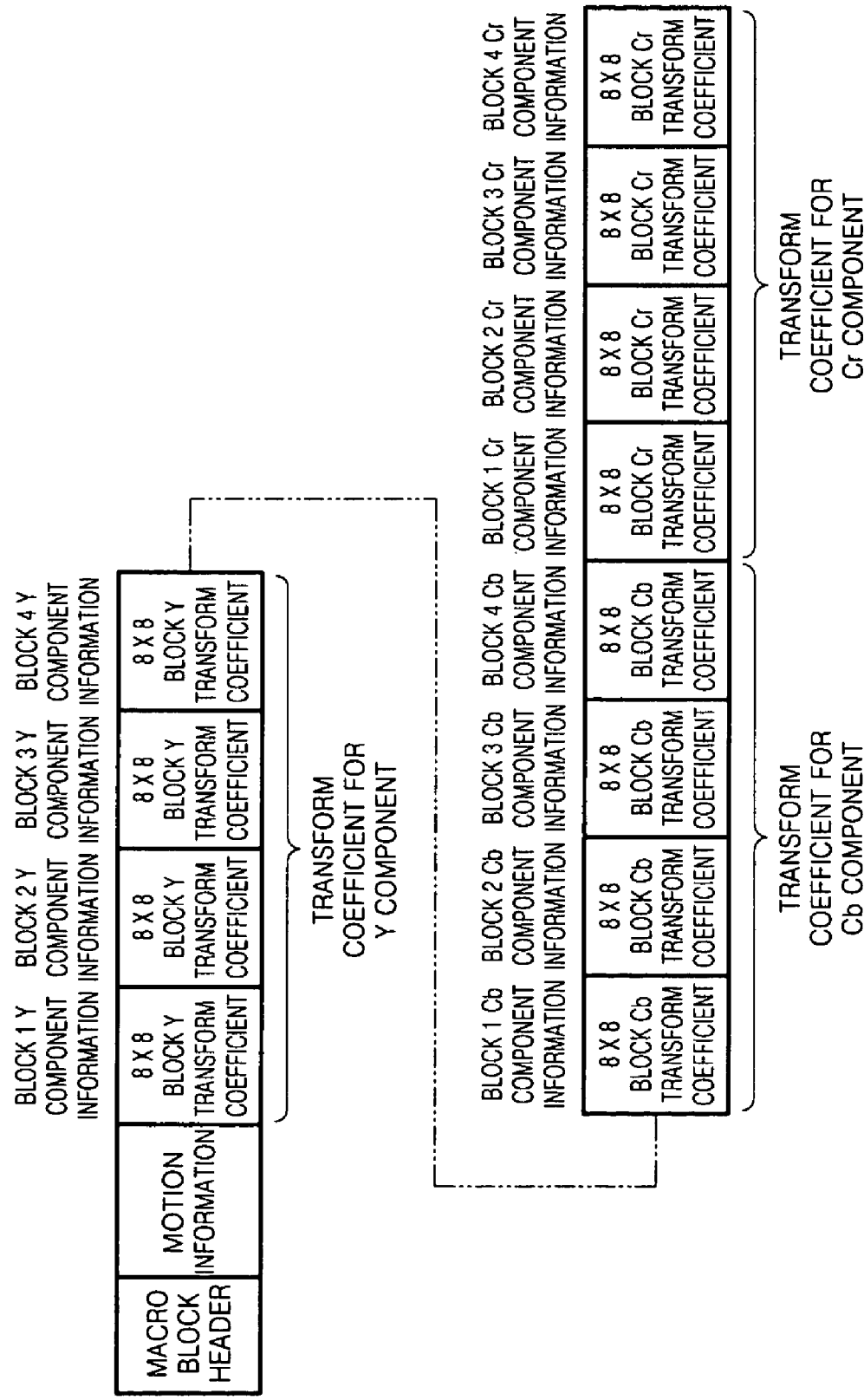
FIG. 2 illustrates a conventional a bitstream generated through entropy encoding.
Figure 3:
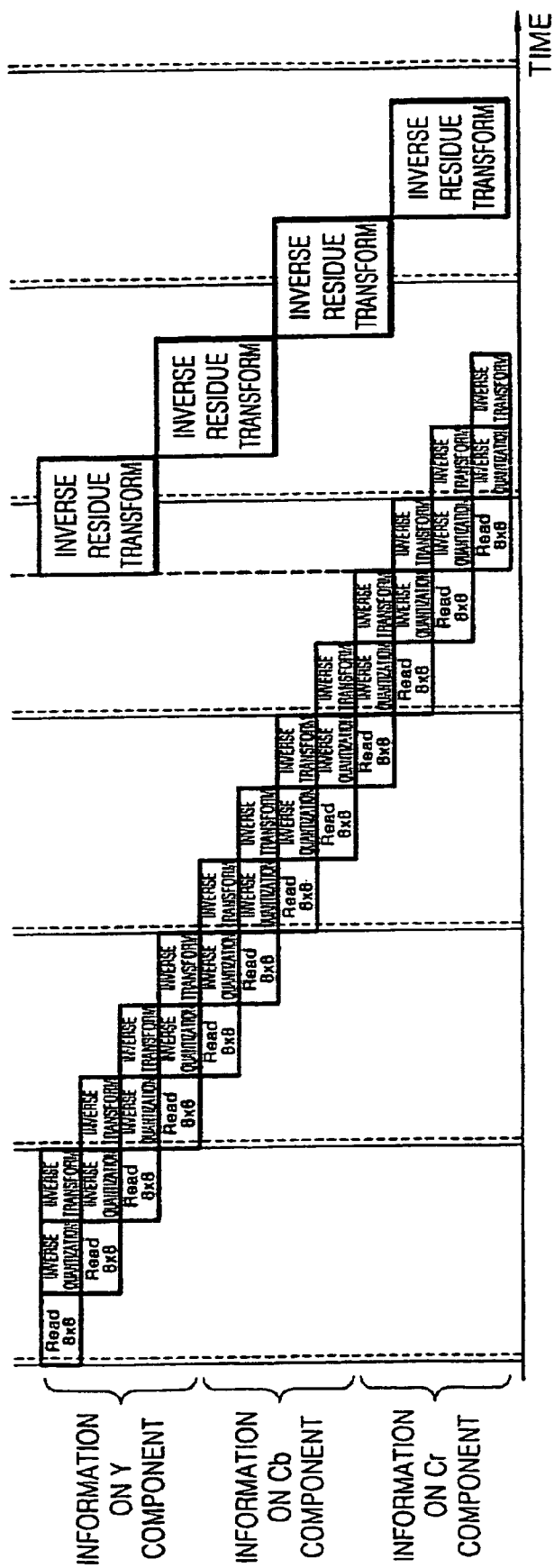
FIG. 3 illustrates conventional decoding order of image block units of a macroblock and the delayed occurrence of an inverse residue transform.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 4:
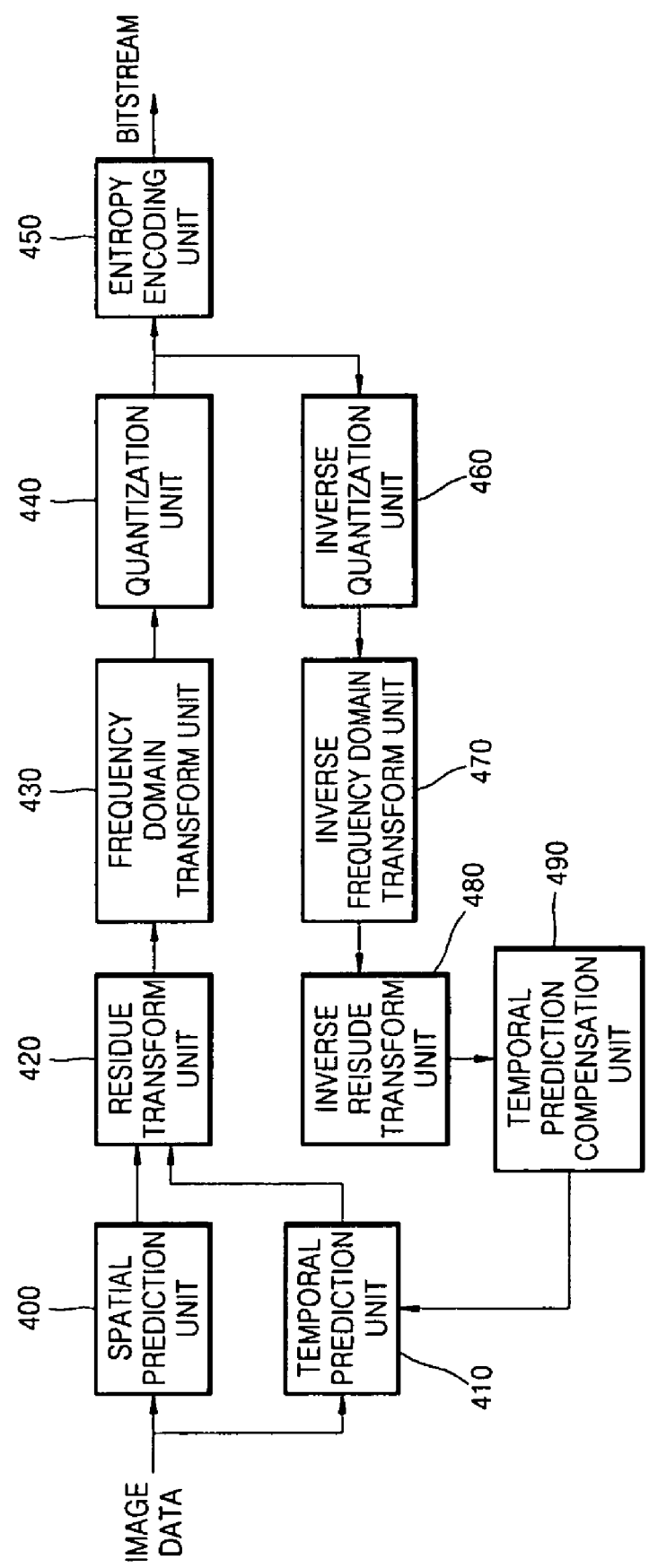
FIG. 4 illustrates an image data encoding system, according to an embodiment of the present invention.

FIG. 4 illustrates an image data encoding system, according to an embodiment of the present invention. The image data encoding system/apparatus may include a spatial prediction unit 400, a temporal prediction unit 410, a residue transform unit 420, a frequency domain transform unit 430, a quantization unit 440, an entropy encoding unit 450, an inverse quantization unit 460, an inverse frequency domain transform unit 470, an inverse residue transform unit 480, and a temporal prediction compensation unit 490, for example.

In order to increase the compression efficiency of an image, the spatial prediction unit 400 extracts a block, in the image, similar to a block that is desired to be currently encoded, and by using the extracted similar block in the image, encodes the current block. Here, the referenced 'block' may be a macroblock of the image, e.g., a 16×16 pixel block from the image. The temporal prediction unit 410 extracts a block, temporally distinguished from the image, similar to the block desired to be currently encoded, e.g., from the previous image input from the temporal prediction compensation unit 490, and encodes the difference between the extracted block pixel value of the previous image block, for example, and the block pixel value of the current image block.

The residue transform unit 420 performs residue transform of the image, i.e., a color transform removing redundancy between colors in the image data spatially or temporally predicted. The residue transform method will now be explained in more detail with an example for performing a residue transform of a temporally prediction encoded RGB image block, according to an embodiment of the present invention.

The temporal prediction unit 410 calculates ΔR, ΔG, and ΔB, which are the respective differences between the R, G, and B pixel values of a current block and the R, G, and B pixel values of a block similar to the current block, e.g., from the previous image. The residue transform unit 420 may calculate $\Delta^2 R$, $\Delta^2 G$, and $\Delta^2 B$, as the result of the residue transform of the ΔR, ΔG, and ΔB, according to the following Equation 1, for example.

$$\begin{bmatrix} \Delta^2 R \\ \Delta^2 G \\ \Delta^2 B \end{bmatrix} = \begin{bmatrix} 1 & -1 & 0 \\ 0 & 1 & 0 \\ 0 & -1 & 1 \end{bmatrix} \begin{bmatrix} \Delta R \\ \Delta G \\ \Delta B \end{bmatrix} \quad \text{Equation 1}$$

Here, an inverse transform equation of the residue color transform of the Equation 1 can be expressed according to the following Equation 2, for example.

$$\begin{bmatrix} \Delta R \\ \Delta G \\ \Delta B \end{bmatrix} = \begin{bmatrix} 1 & 1 & 0 \\ 0 & 1 & 0 \\ 0 & 1 & 1 \end{bmatrix} \begin{bmatrix} \Delta^2 R \\ \Delta^2 G \\ \Delta^2 B \end{bmatrix} \quad \text{Equation 2}$$

A transform equation used to perform residue color transform to consider the correlation between color components, in order to more efficiently remove the redundancy between color components, may be expressed according to the following Equation 3, for example.

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \quad \text{Equation 3}$$

Here, the inverse transform equation, of the residue color transform from the Equation 3, may be expressed according to the following Equation 4.

$$\begin{bmatrix} R \\ G \\ B \end{bmatrix} = \begin{bmatrix} 1 & 1 & -1 \\ 1 & 0 & 1 \\ 1 & -1 & 1 \end{bmatrix} \begin{bmatrix} Y \\ Co \\ Cg \end{bmatrix} \quad \text{Equation 4}$$

By applying the color transform of the Equation 3, the residue transform unit 420 may perform residue transform by calculating the following Equation 5, for example.

$$\begin{bmatrix} \Delta^2 R \\ \Delta^2 G \\ \Delta^2 B \end{bmatrix} = \begin{bmatrix} 1/4 & 1/2 & 1/4 \\ 1/2 & 0 & -1/2 \\ -1/4 & 1/2 & -1/4 \end{bmatrix} \quad \text{Equation 5}$$

Here, again, the inverse transform equation, of the residue color transform of Equation 5, may be expressed according to the following Equation 6.

$$\begin{bmatrix} \Delta R \\ \Delta G \\ \Delta B \end{bmatrix} = \begin{bmatrix} 1 & 1 & -1 \\ 1 & 0 & 1 \\ 1 & -1 & -1 \end{bmatrix} \begin{bmatrix} \Delta^2 R \\ \Delta^2 G \\ \Delta^2 B \end{bmatrix} \quad \text{Equation 6}$$

Further, a transform equation from the RGB image to the YCoCg image, improved by using a lifting method, may be expressed according to the following Equation 7.

$Co = R - B$ $t = B + (Co >> 1)$ $Cg = G - t$ $Y = t + (Cg >> 1)$ \quad Equation 7:

The corresponding inverse transform expression, of the residue color transform of Equation 7, may be expressed according to the following Equation 8.

$t = Y - (Cg >> 1)$ $G = Cg + t$ $B = t - (Co >> 1)$ $R = B + Co$ \quad Equation 8:

Thus, the residue transform unit 420 may transform ΔR, ΔG, and ΔB, as the results of temporal prediction, into $\Delta^2 R$, $\Delta^2 G$, and $\Delta^2 B$, by applying the residue color transform of Equation 7.

The frequency domain transform unit 430 may then perform a frequency domain transform, such as a discrete cosine transform (DCT), of the resultant residue transformed data, and the quantization unit 440 may quantize the frequency domain transformed data. The entropy encoding unit 450 may then divide the quantized data into 8×8 block units, and generate a bitstream by lossless encoding the data sequentially in block units of the divided blocks.

Figure 5:
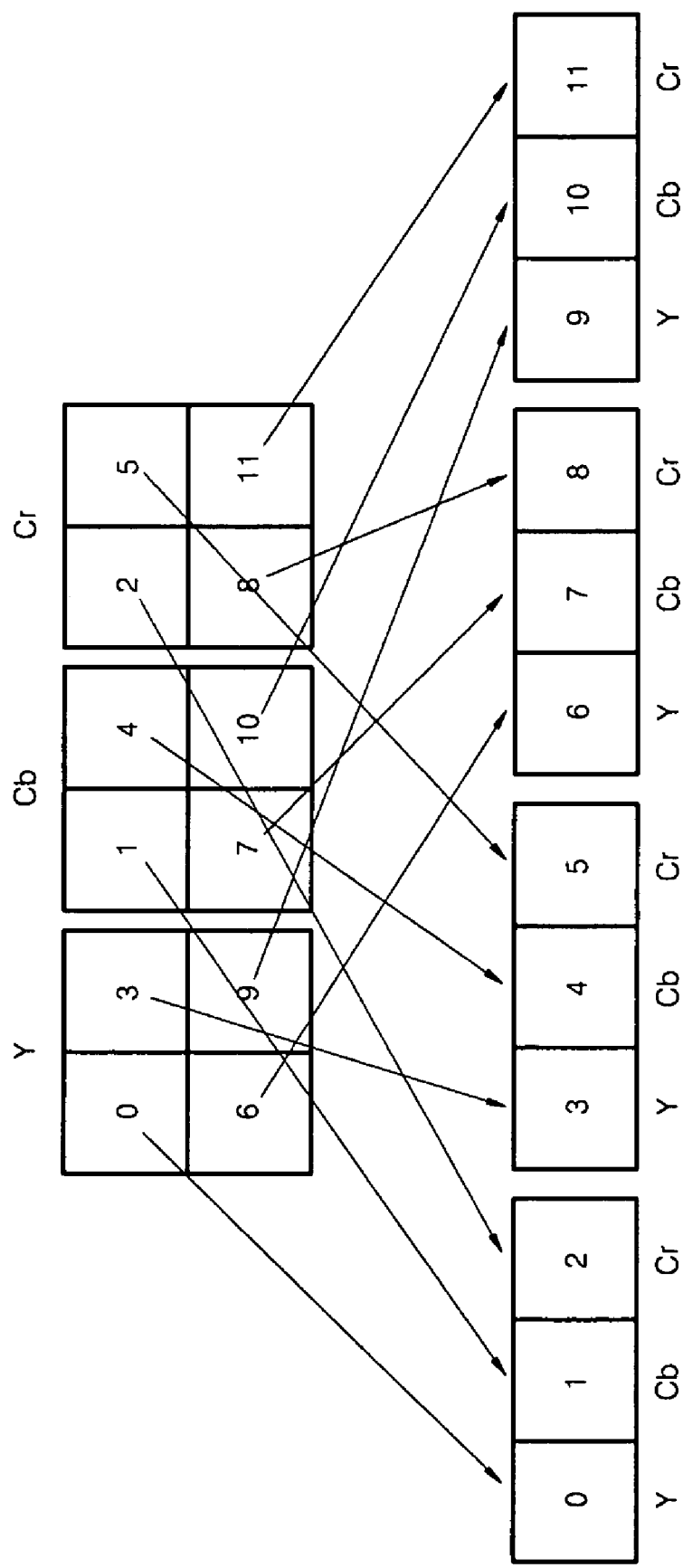
FIG. 5 illustrates a method of ordering Y, Cb and Cr block units for encoding, according to an embodiment of the present invention.

As an example of an ordering of the block information for a macroblock, and according to an embodiment of the present invention, FIG. 5 illustrates a bitstream result from the entropy encoding unit 450 dividing Y, Cb and Cr block information data of encoded blocks of a macroblock, into block units. The divided data can then be sequentially reordered based on color components for each block for the macroblock, i.e., the resultant information of the color components for the first block (e.g., upper left corner of the macroblock) are followed by the information of the color components of the second block (e.g., upper right corner of the macroblock), which is followed by the information of the color components of the third block (e.g., lower left corner of the macroblock), which is followed by the information of the color components of the fourth block (e.g., lower right corner of the macroblock).

As illustrated in FIG. 4, the inverse quantization unit 460 performs inverse quantization of the quantized data output from the quantization unit 440, and the inverse frequency domain transform unit 470 performs an inverse frequency domain transform, such as an inverse discrete cosine transform (IDCT), of the inverse quantized data. Then the inverse residue transform unit 480 performs inverse residue transform of the IDCT transformed data, for example, by using an inverse residue transform equation, such as the above Equations 2, 4, 6, and 8. The temporal prediction compensation unit 490 may then restore an image by adding the prediction value used in the temporal prediction, to the inverse residue transformed data, and the restored image may be used as a prediction image in order for the temporal prediction unit 410 to perform temporal prediction of the next image.

Figure 6:
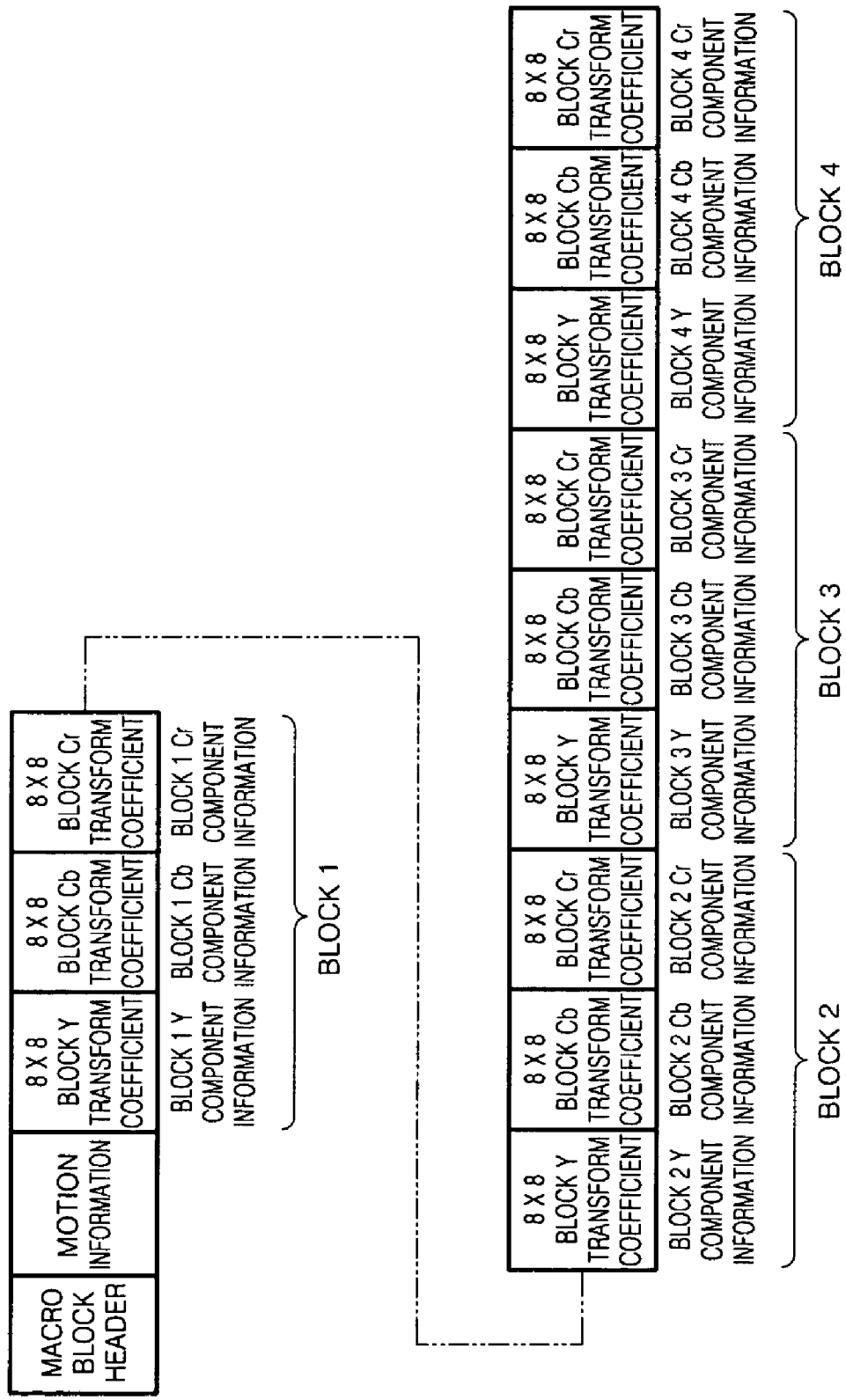
FIG. 6 illustrates a bitstream generated through entropy encoding, according to an embodiment of the present invention.

FIG. 6, thus, illustrates a bitstream according to an embodiment of the present invention, e.g., as generated by the entropy encoding unit 450. As shown in FIG. 6, the entropy encoding unit 450 may generate the bitstream by sequentially connecting the quantized data items, divided into block units.

Figure 7:
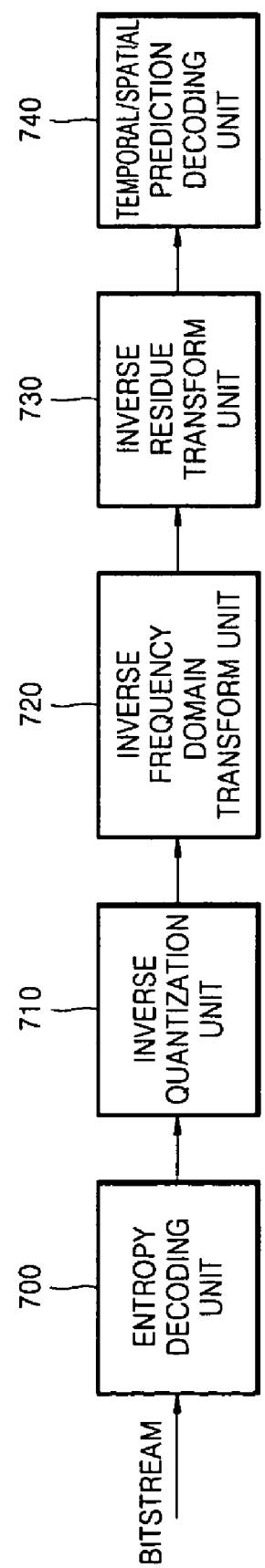
FIG. 7 illustrates an image data decoding system, according to an embodiment of the present invention.
Figure 8:
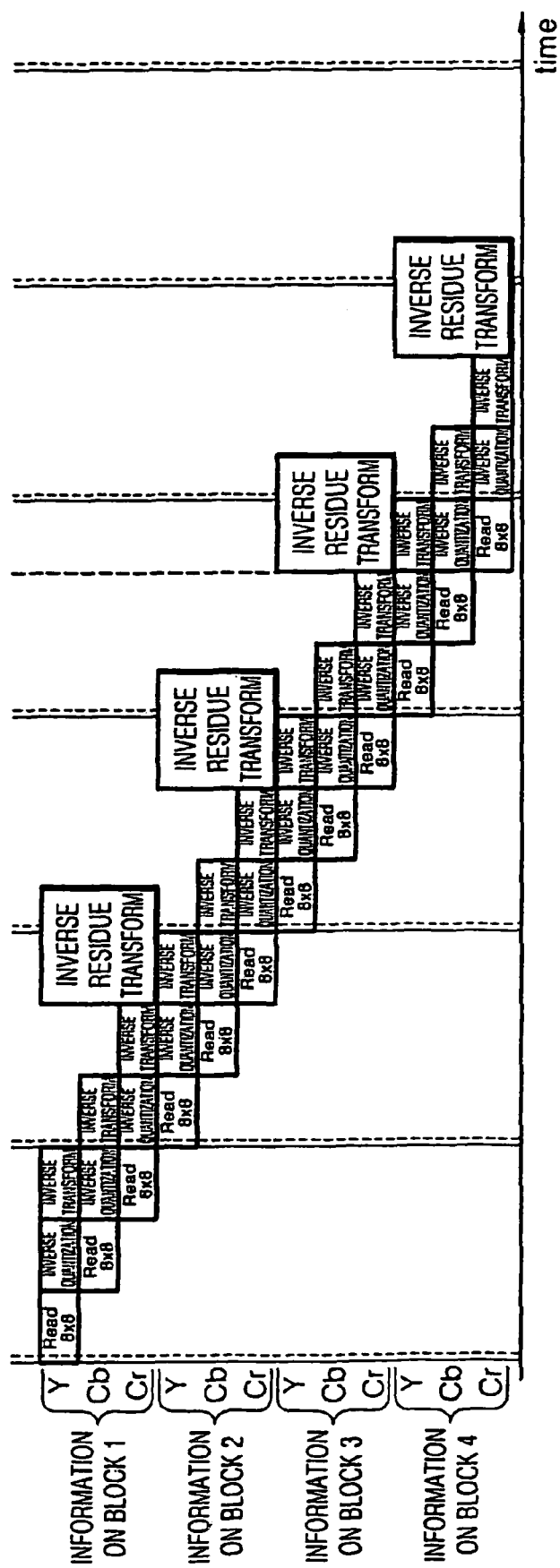
FIG. 8 illustrates a decoding order of image block units of a macroblock, with an inverse residue transform occurring after each complete Y, Cb, and Cr block unit combination, sequentially through different blocks of the macroblock, according to an embodiment of the present invention.

FIG. 7 illustrates an image data decoding system, according to an embodiment of the present invention. The decoding system may include an entropy decoding unit 700, an inverse quantization unit 710, an inverse frequency domain transform unit 720, an inverse residue transform unit 730, and a temporal/spatial prediction decoding unit 740, for example.

The entropy decoding unit 700 entropy decodes an input bitstream and reads in Y color component data of block 1 (e.g., upper left corner of the corresponding macroblock) among the four potential 8×8 pixel blocks included in the bitstream for one macroblock. The inverse quantization unit 710 may first perform inverse quantization of the Y color component data of the read block 1, then the inverse frequency domain transform unit 720 performs an inverse frequency domain transform, such as an IDCT, of the inverse quantized data and restores the Y color component pixel value of block 1.

After the entropy decoding of the Y color component data of the block 1 has completed, entropy decoding and reading, inverse quantization, and inverse frequency domain transform of the Cb color component data of the block 1 may be sequentially performed.

Similarly, after the entropy decoding of the Cb color component data of the block 1 has completed, entropy decoding and reading, inverse quantization, and inverse frequency domain transform of the Cr color component data of the block 1 may be sequentially performed.

Thus, in an embodiment of the present invention, after all the entropy decoding, inverse quantization, and inverse frequency domain transform of the Y, Cb, and Cr color component data of the block 1 have been completed, the inverse residue transform unit 730 may perform inverse residue transform of the restored Y, Cb, and Cr color component data. The specific operation of the inverse residue transform 730 may be similar to that of the inverse residue transform unit 480 included in the aforementioned encoding system.

After the entropy decoding of the block 1 has been completed, inverse quantization, inverse frequency domain transform, and inverse residue transform of block 2 (e.g., upper right corner of the corresponding macroblock) may then be sequentially performed in a similar manner. Accordingly, after the following sequential inverse quantization, and inverse frequency domain transform of block 3 (e.g., lower left corner of the corresponding macroblock) and block 4 (e.g., lower right corner of the corresponding macroblock) are sequentially completed, the inverse quantization, and inverse frequency domain transform of the one macroblock can be considered completed.

Thereafter, the temporal/spatial prediction decoding unit 740 may perform temporal or spatial prediction decoding of the resultant inverse residue transformed blocks and restore an image.

In addition to the above described embodiments, embodiments of the present invention can also be implemented through computer readable code/instructions in/on a medium, e.g., a computer readable medium. The medium can correspond to any tangible medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage, for example. The media may also be a distributed network, so that the computer readable code is stored and executed in a distributed fashion.

Thus, according to an encoding and/or decoding method, medium, and system of image data, according to embodiments of the present invention, at least as described above, when image data is encoded and/or decoded by using a residue color transform, a bitstream is generated and encoded according to blocks of the image, rather than color components, and when the bitstream is decoded, an image is restored from the bitstream in sequential blocks. By doing so, delay of image processing, which may typically occur when conventional decoding is performed, can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image encoding method of encoding image data, the method comprising:

dividing, using at least one processing device, image data into block units for separate component macroblocks, of an image macroblock; and generating a bitstream by sequentially entropy encoding select block units, each from different component macroblocks, such that encoded block units from a same component macroblock are staggered within the bitstream.

2. The method of claim 1, wherein the macroblock represents a reduced pixel portion of the image data and each component macroblock is made up of four block units, and the separate component macroblocks comprise at least a component macroblock for luminance information, of the image macroblock, and a component macroblock for chrominance information, of the image macroblock.

3. The method of claim 1, further comprising performing residue color transform of the image data.

4. The method of claim 3, wherein, in the residue color transform, RGB data is transformed into YCoCg data based on:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}.$$

5. The method of claim 3, wherein, in the residue color transform, RGB data is transformed into YCoCg data based on:

$Co=R-B$ $t=B+(Co>>1)$ $Cg=G-t$ $Y=t+(Cg>>1)$.

6. The method of claim 1, further comprising:
performing temporal prediction encoding of the image data; and
performing residue color transform of resultant temporal prediction encoded data.

7. The method of claim 1, further comprising:
performing spatial prediction encoding of the image data; and
performing residue color transform of resultant spatial prediction encoded data.

8. At least one medium comprising computer readable code to implement the method of claim 1.

9. An image decoding method of decoding image data, the method comprising:
reading, using at least one processing device, a bitstream; and
restoring image data of a macroblock of an original image by sequentially entropy decoding block units from the bitstream, with sequential block unit information in the bitstream being for a same area within the macroblock while being from different component macroblocks of the macroblock, such that block unit information from a same component macroblock are staggered within the bitstream.

10. The method of claim 9, further comprising receiving the bitstream.

11. The method of claim 9, wherein the macroblock represents a reduced pixel portion of the original image and each different component information corresponds to a separate component macroblock that is made up of four block units, with the separate component macroblocks comprising at least a component macroblock for luminance information of the macroblock and a component macroblock for chrominance information of the macroblock.

12. The method of claim 9, further comprising inverse residue color transforming the entropy decoded block units corresponding to the macroblock.

13. The method of claim 12, wherein the restoring of the image data comprises:
performing inverse frequency domain transform of data for the entropy decoded block units; and
performing the inverse residue color transform of resultant inverse frequency domain transformed block data.

14. The method of claim 13, further comprising inverse quantizing the entropy decoded block units.

15. The method of claim 13, wherein the inverse residue color transform is performed immediately after the inverse frequency domain transform of the data of the entropy decoded blocks is completed.

16. At least one medium comprising computer readable code to implement the method of claim 9.

17. An image decoding method of decoding image data, the method comprising:
reading, using at least one processing device, a bitstream;
restoring image data of a macroblock of an original image by sequentially entropy decoding block units from the bitstream, with sequential block unit information in the bitstream being for a same area within the macroblock while being from different component macroblocks of the macroblock; and
inverse residue color transforming the entropy decoded block units corresponding to the macroblock,
wherein, in the inverse residue color transform, YCoCg data is transformed into RGB data based on:

$$\begin{bmatrix} R \\ G \\ B \end{bmatrix} = \begin{bmatrix} 1 & 1 & -1 \\ 1 & 0 & 1 \\ 1 & -1 & 1 \end{bmatrix} \begin{bmatrix} Y \\ Co \\ Cg \end{bmatrix}.$$

18. An image decoding method of decoding image data, the method comprising:
reading, using at least one processing device, a bitstream;
restoring image data of a macroblock of an original image by sequentially entropy decoding block units from the bitstream, with sequential block unit information in the bitstream being for a same area within the macroblock while being from different component macroblocks of the macroblock; and
inverse residue color transforming the entropy decoded block units corresponding to the macroblock,
wherein, in the inverse residue color transform, YCoCg data is transformed into RGB data based on:

$t=Y-(Cg>>1)$ $G=Cg+t$ $B=t-(Co>>1)$ $R=B+Co.$

19. A medium encoded with sequentially entropy encoded select block units, each from different component macroblocks of a macroblock, such that encoded block units from a same component macroblock are staggered within a signal, defining a reproducing of image data through interaction with a computational device by receiving information of the sequentially entropy encoded select block units, reproducing the image data by sequentially entropy decoding the block units, and performing an inverse residue transform of data of the decoded block units.

20. An image encoding system for encoding image data, the system comprising:
a block data generation unit to divide image data into block units for separate component macroblocks, of an image macroblock; and
an entropy encoding unit to generate a bitstream by sequentially entropy encoding select block units, each from different component macroblocks, such that encoded block units from a same component macroblock are staggered within the bitstream.

21. The system of claim 20, further comprising a residue transform unit to perform residue color transform of the image data.

22. The system of claim 20, further comprising:
a temporal prediction unit to perform temporal prediction encoding of the image data; and
a residue transform unit to perform residue color transform of resultant temporal prediction encoded data.

23. The system of claim 20, further comprising:
a spatial prediction unit performing spatial prediction encoding of the image data; and
a residue transform unit performing residue color transform of resultant spatial prediction encoded data.

24. An image encoding system for encoding image data, the system comprising:
a block data generation unit to divide image data into block units for separate component macroblocks, of an image macroblock;

an entropy encoding unit to generate a bitstream by sequentially entropy encoding select block units, each from different component macroblocks, such that encoded block units from a same component macroblock are staggered within the bitstream; and a residue transform unit to perform residue color transform of the image data, wherein the residue transform unit transforms RGB data into YCoCg data based on:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}.$$

25. An image encoding system for encoding image data, the system comprising:

a block data generation unit to divide image data into block units for separate component macroblocks, of an image macroblock;

an entropy encoding unit to generate a bitstream by sequentially entropy encoding select block units, each from different component macroblocks, such that encoded block units from a same component macroblock are staggered within the bitstream; and a residue transform unit to perform residue color transform of the image data, wherein the residue transform unit transforms RGB data into YCoCg data based on:

$Co = R - B$ $t = B + (Co >> 1)$ $Cg = G - t$ $Y = t + (Cg >> 1)$.

26. An image decoding system for decoding image data, the system comprising:

a bitstream reading unit to read a bitstream; and an entropy decoding unit to restore image data of a macroblock of an original image by sequentially entropy decoding block units from the bitstream, with sequential block unit information in the bitstream being for a same area within the macroblock while being from different component macroblocks of the macroblock, such that block unit information from a same component macroblock are staggered within the bitstream.

27. The system of claim 26, further comprising a bitstream input unit to receive an input of the bitstream.

28. The system of claim 26, further comprising an inverse residue transform unit to perform an inverse residue color transforming of the entropy decoded block units corresponding to the macroblock.

29. The system of claim 26, further comprising:

an inverse frequency domain transform unit to perform inverse frequency domain transform of data for the entropy decoded block units; and a residue transform unit to performing residue color transform of resultant inverse frequency domain transformed block data.

30. The system of claim 29, further comprising an inverse quantization unit to inverse quantize entropy decoded block units.

31. An image decoding system for decoding image data, the system comprising:

a bitstream reading unit to read a bitstream;

an entropy decoding unit to restore image data of a macroblock of an original image by sequentially entropy decoding block units from the bitstream, with sequential block unit information in the bitstream being for a same area within the macroblock while being from different component macroblocks of the macroblock; and an inverse residue transform unit to perform an inverse residue color transforming of the entropy decoded block units corresponding to the macroblock, wherein the inverse residue transform unit transforms YCoCg data into RGB data based on:

$$\begin{bmatrix} R \\ G \\ B \end{bmatrix} = \begin{bmatrix} 1 & 1 & -1 \\ 1 & 0 & 1 \\ 1 & -1 & 1 \end{bmatrix} \begin{bmatrix} Y \\ Co \\ Cg \end{bmatrix}.$$

32. An image decoding system for decoding image data, the system comprising:

a bitstream reading unit to read a bitstream;

an entropy decoding unit to restore image data of a macroblock of an original image by sequentially entropy decoding block units from the bitstream, with sequential block unit information in the bitstream being for a same area within the macroblock while being from different component macroblocks of the macroblock; and an inverse residue transform unit to perform an inverse residue color transforming of the entropy decoded block units corresponding to the macroblock, wherein the inverse residue transform unit transforms YCoCg data into RGB data based on:

$t = Y - (Cg >> 1)$ $G = Cg + t$ $B = t - (Co >> 1)$ $R = B + Co$.

* * * * *